Figure 1:
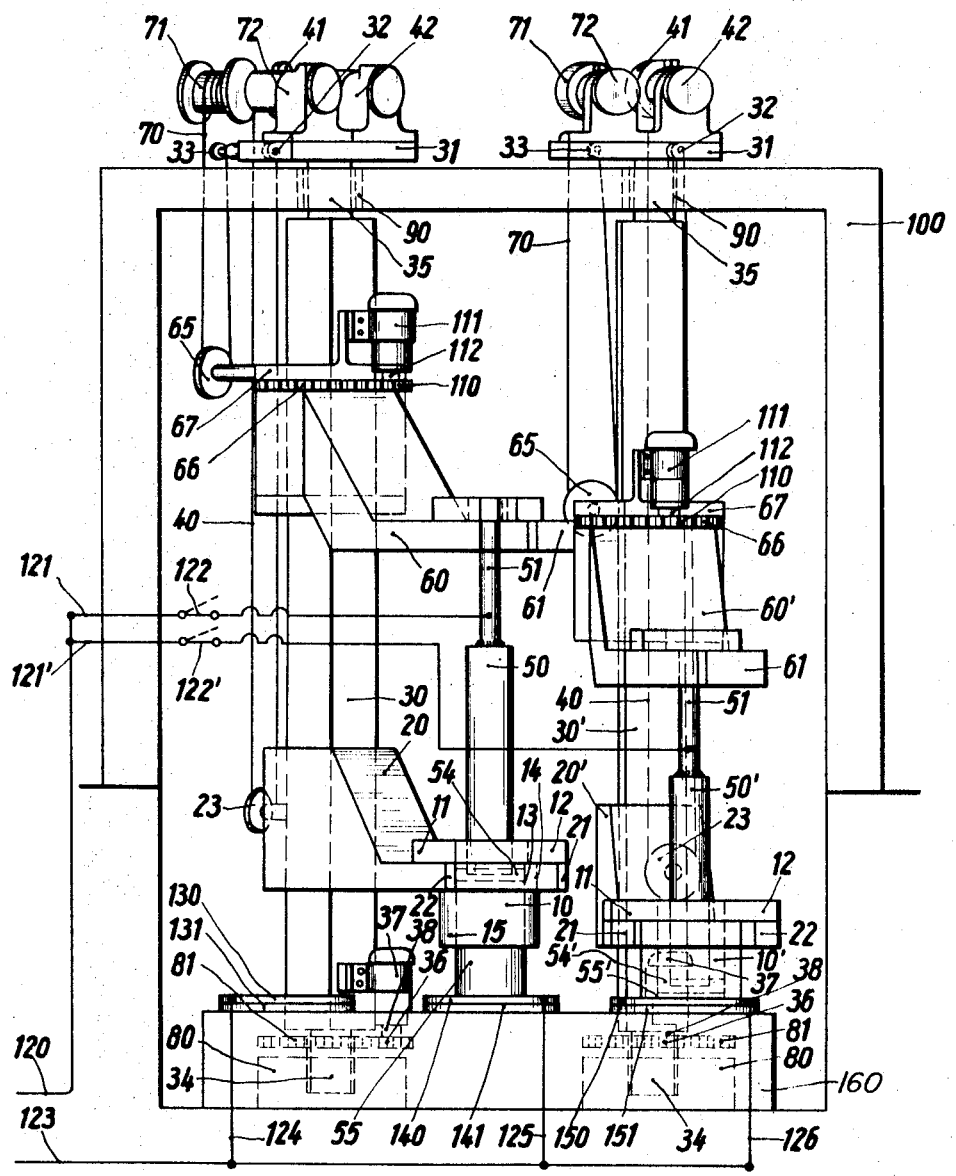

United States Patent

[11] 3,587,715

[72] Inventors Wolfgang Holzgruber;
 Otmar Kleinhagauer, Kapfenberg, Austria
[21] Appl. No. 783,270
[22] Filed Dec. 12, 1968
[45] Patented June 28, 1971
[73] Assignee Gebr Bohler & Co., Aktiengesellschaft
 Vienna, Austria
[32] Priority Dec. 14, 1967
[33] Austria
[31] 11259/67

[54] PLANT FOR PRODUCING INGOTS DIFFERING IN SIZE BY AN ELECTRIC REMELTING OF METAL
 9 Claims, 3 Drawing Figs.
[52] U.S. Cl........................................................ 164/252, 13/9
[51] Int. Cl......................................................... B22d 27/02

[50] Field of Search............................................ 164/50, 52, 250, 252; 13/9; 75/10

[56] References Cited
UNITED STATES PATENTS
3,152,372 10/1964 Hopkins........................ 75/10X
3,404,209 10/1968 Brooke........................... 13/9
FOREIGN PATENTS
1,189,359 3/1959 France............................ 13/9

*Primary Examiner* — J. Spencer Overholser
*Assistant Examiner* — R. Spencer Annear
*Attorney* — Arthur O. Klein

ABSTRACT: Two electrode holders are operated in alternation to introduce electrodes to be remelted in close succession into one of two molds. One of said electrode holders is operated from time to time to introduce electrodes to be remelted into the other of said two molds.

PATENTED JUN 28 1971

3,587,715

SHEET 1 OF 3

Inventors:
WOLFGANG HOLZGRUBER
OTMAR KLEINHAGAUER by: Arthur O. Klein
Attorney

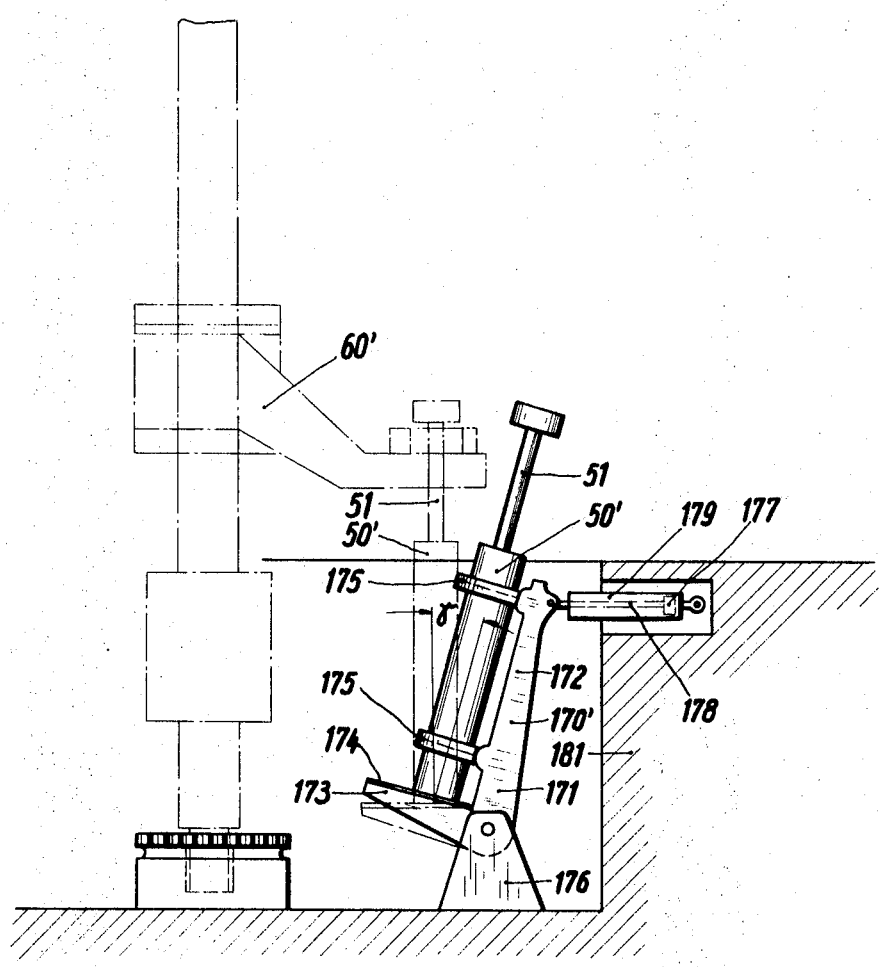

3,587,715

PLANT FOR PRODUCING INGOTS DIFFERING IN SIZE BY AN ELECTRIC REMELTING OF METAL

This invention relates to a process of producing ingots in different sizes by an electric remelting of metal, particularly of steel, and a plant for carrying out the same.

In an endeavor to develop electric slag refining processes and to improve the efficiency thereof, it is desirable to produce steel ingots which have been made from a plurality of main electrodes fused down in succession. When the remelting process has caused one main electrode to be remelted except for a short remainder by the heat which is generated by the electric current that flows out of said electrode, the electrode holder must be lifted to pull said remainder out of the mold; a new main electrode is then replaced for the remainder of the previous one and the electrode holder is lowered to introduce the new main electrode into the mold, where the new main electrode is subsequently fused down. To prevent a cooling and solidification of the molten metal in the mold during the above-described replacement of an electrode, so called auxiliary electrodes are usually employed, which carry electric current during that phase.

In many cases, large steel ingots made from a plurality of electrodes which have been fused down in succession are required as well as small ingots made from a single electrode which has been fused down. It is an object of the invention to provide a process which enables the production of large and small metal ingots by electric slag refining in a plant having an extremely small structural expenditure and requiring only a minimum of space. In a process of the kind described first hereinbefore, this object is accomplished in that electrodes which are to be remelted are fed in immediate succession in alternation by two electrode holders to one of two molds whereas one of these electrode holders is operated from time to time to introduce electrodes which are to be remelted into the other of the two molds. The first-mentioned one of the two molds is used to make large steel ingots from a plurality of electrodes which have been fused down, whereas the other mold is used to make relatively small ingots from a single electrode that has been fused down.

In a preferred mode of carrying out the process according to the invention, the respective electrode holder is displaced or pivotally moved in a horizontal direction during the feeding of a new electrode and during the removal of the remainder of a fused-down electrode to and from the respective mold. This practice facilitates the replacement of the remainders of the fused-down electrodes depending from the electrode holders by new electrodes and the introduction of the latter into the molds.

It will also be particularly desirable if the ingots made from a plurality of electrodes which have been fused down are made in alternation in the two molds so that such ingots can be made in a close succession.

In another preferred practice, both molds are displaced or pivotally moved in a horizontal direction whenever an ingot has been made from a plurality of remelted electrodes so that the ingots made from a plurality of remelted electrodes are always formed at the same location.

A plant which serves to carry out the process according to the invention comprises two vertical columns, and each of said columns has associated with it a mold-lifting carriage with a mold, and an electrode holder, which carriage and holder are displaceable along said column, preferably with the aid of tension cables, and arranged to be pivotally movable in a horizontal direction in such a manner that the molds and fusible electrodes carried by different columns are pivotally movable along intersecting circular arcs.

Figure 2:
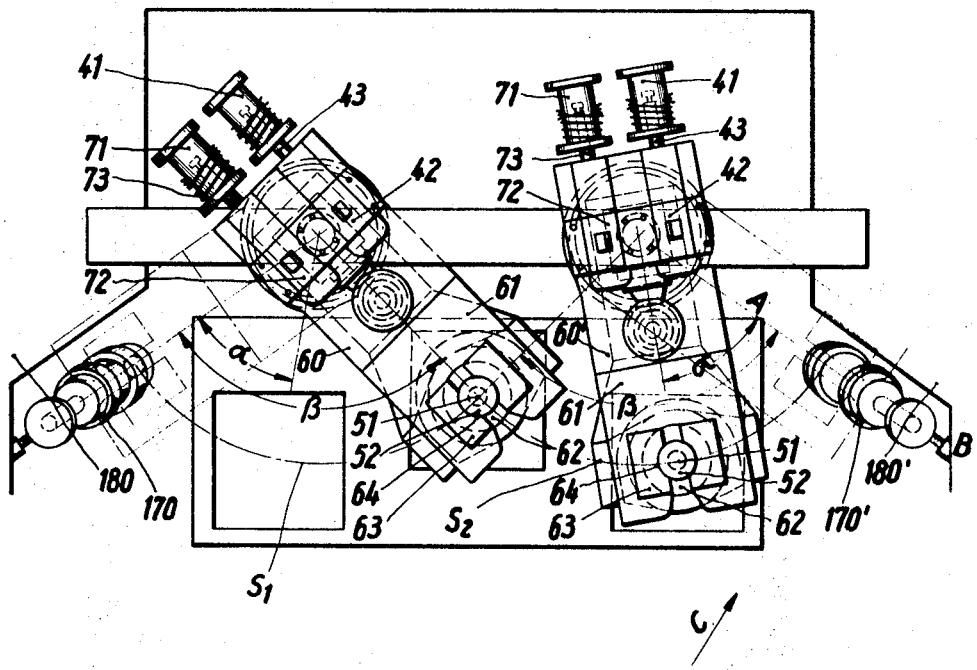

Further details of the process according to the invention and of the above-mentioned plant for carrying out the process will become apparent from the following description of an embodiment which is shown diagrammatically and by way of example in the drawing, in which:

FIG. 1 is an elevation showing a plant for the electric remelting (electric slag refining) of steel, FIG. 2 is a top plan view showing said plant, FIG. 3 is a side elevation taken from line A-B of FIG. 2 and viewed in the direction of arrow C.

The illustrated plant comprises two replaceable molds 10 and 10', which have side arms 11 and 12 resting on the two forked arms 21 and 22 of respective mold-lifting carriages 20 and 20'. Each mold-lifting carriage 20 or 20' is displaceable along a rotatable vertical column 30 or 30', which is square in cross section. Each mold-lifting carriage 20 or 20' is supported by a wire cable 40, which can be wound on a cable drum 41 and is trained around the grooved pulley 23, which is rotatably mounted on the mold-lifting carriage 20 or 20'. One end of the wire cable 40 is secured with the aid of the bracket 32 to the supporting plate 31, which is provided at the top end of the column 30 or 30'. The other end of the wire cable is secured to the cable drum 41. Each of the two electrodes 50 and 50' which are to be fused down is provided at its upper end with an extension rod 51 and suspended from an electrode holder 60 or 60', which is provided on the column 30 or 30'. The arm portion 61 of the electrode holder is formed at that end which is remote from the column 30 or 30' with a longitudinal slot 62, which receives the extension rod 51. The latter is provided at its upper end with a collar 52, which rests on the arm 61 to prevent the electrode 50 or 50' from falling down. Two retaining plates 63 provided each with an approximately semicircular recess 64 are secured to the arm 61 and disposed on opposite sides of the slot 62. The two recesses 64 receive the collar 52 of the extension rod 51 so that the latter cannot slide out of the slot 62. Just as the mold-lifting carriage 20 or 20' disposed below the electrode holder 60 or 60', the latter is displaceable along the column 30 or 30' and is also held by a wire cable 70, which can be wound on a cable drum 71. The cable 70 is trained around the grooved pulley 65, which is rotatably mounted on the slide member 67 of the electrode holder 60 or 60'. One end of the wire cable 70 is secured by the bracket 33 to the supporting plate 31, which is provided at the upper end of the column 30 or 30'. The other end of the wire cable 70 is secured to the cable drum 71. The mold-lifting carriage 20 or 20', and the mold 10 or 10' carried by it, as well as the electrode holder 60 or 60' and the electrode 50 or 50' depending from it, can be adjusted in height by the two electric gearmotors 42 and 72 respectively, which are screw-connected to the supporting plate 31 and have stub shafts 43 and 73, to which the cable drums 41 and 71 are secured respectively. At their upper and lower ends, the two columns 30 and 30' have cylindrical journals 34 and 35, which are guided by the bearings 80 and 90. The lower bearings 80 are directly secured to the floor and provide for a support in the axial and radial direction. The upper bearings 90 are held by the frame 100 and constitute mere radial bearings. A ring gear 81 is secured to the upper face of each lower bearing 80 and is in mesh with a pinion 36, which is keyed to the stub shaft 38 of an electric gearmotor 37, which is screw-connected to the column 30 or 30'. This electric gearmotor 37 enables a rotation of the columns 30 and 30'. Each electrode holder 60 or 60' is composed of a slide member 67, which is vertically displaceable along the column 30 or 30', and an arm portion 61, which is rotatable on the slide member 67. A ring gear 66 is secured to the top edge of each arm portion 61 and in mesh with a pinion 110, which is keyed to the stub shaft 112 of an electric gearmotor 111 that is screw-connected to the slide member 67. The electric gearmotor 111 is operable to impart a pivotal movement to the arm portions 61 and the electrodes 50 and 50' depending therefrom about the longitudinal axis of the columns 30 and 30'. The plant further comprises three bottom plates 130, 140, and 150, which consist preferably of copper and which support the metal ingots 55 and 55' formed by the remelting operation. The center of one bottom plate 140 lies approximately on the vertical line which extends through the circular arcs $S_1$ and $S_2$ along which the two molds 10 and 10' are pivotally movable. The two other bottom plates 130 and 150 are disposed on opposite sides of the bottom plate 140 and under the above-mentioned circular arcs $S_1$ and $S_2$, respectively. An electrically insulating intermediate plate 131, 141 or 151 is provided under each of these bottom plates 130, 140 and 150, which consist preferably of copper. The intermediate plates 131, 141 and 151 rest on a pedestal 160.

As the electrode 50 or 50' is fused down, the electrode 50 or 50' and the mold 10 or 10' are so adjusted in height that the electrode 50 or 50' is immersed in the slag layer 54 or 54' which floats on the molten metal and serves to refine and shield the molten steel, the end of the electrode is spaced the desired distance apart from the surface of the molten metal, and the position of said surface relative to the mold 10 or 10' remains unchanged. An electric lead 120 extends from one terminal of the electric power source, not shown, which is employed and consists generally of the secondary winding of a transformer. Branch leads 121 and 121' include switches 122 and 122', respectively, and extend from the lead 120 to the extension rods 51 of the two electrodes 50 and 50'. An electric lead 123 extends from the other terminal of the electric power source. Electric leads 124, 125 and 126 extend from the lead 123 to the three bottom plates 130, 140 and 150. As long as an electrode 50 or 50' is immersed in the slag layer 54 or 54', the associated switch 122 or 122' is closed so that current flows via the electric lead 121 or 121' to the electrode 50 or 50', which is thus fused down. When the remainder of the electrode 50 or 50' must then be pulled out of the mold 10 or 10' for a replacement of the electrode, the switch 122 or 122' is preferably automatically opened. This is shown in dotted lines. At the same time, the electrode holder 60 or 60' is raised until the lower end of the remainder of the electrode 50 or 50' is above the top edge of the mold 10 or 10'. The arm portion 61 of the electrode holder 60 or 60' is then pivotally moved to a position directly over the electrode feeder 170 or 170', which is disposed beside the outer bottom plate 130 or 150. (The pivotally moved arm portion 61 of the electrode holder 60 or 60' is diagrammatically shown in FIG. 2.) The electrode holder 60 or 60' is then lowered and the remainder of the electrode 50 or 50' 179 is removed from the electrode holder 60 or 60' by a person standing on the platform 180 or 180'. At this time, a prepared new electrode 50 or 50' is disposed on the electrode feeder 170 or 170'. Each of the two electrode feeders 170 and 170' comprises a pivoted bellcrank lever 171, which is mounted at its vertex on the bearing block 176, which is secured to the floor. The shorter arm 173 of the pivoted lever 171 is slightly inclined from the horizontal. The prepared new electrode 50 or 50' rests on a plate 174, which is secured to the upper side of the arm 173. The longer arm 172 of the pivoted lever 171 is slightly inclined from the vertical and is provided at each of its two end portions with a ring 175, which embraces the prepared electrode 50 or 50'. As soon as the remainder of the electrode 50 or 50' has been removed from the electrode holder 60 or 60', the lever 171 is pivotally moved with the aid of a piston 177, which is contained in a cylinder 179 and to which pneumatic pressure is applied. As a result, the extension rod 51 of the electrode 50 or 50' slides in the slot 62, which is provided in the electrode holder 60 or 60', and the electrode 50 or 50' assumes a vertical position. The piston 177 which is contained in the cylinder 170 and to which pneumatic pressure can be applied has a piston rod 178. At that end which is remote from the piston 177, the piston rod 178 is articulately connected to the longer arm 172 of the lever 171. The cylinder 179 is articulately connected to the sidewall 181. (The electrode 50 in its vertical attitude is shown in dash-dot lines in FIG. 3.) In the next step, the electrode holder 60 or 60' and the electrode 50 or 50' secured to it are raised until the lower end of the electrode is above the top edge of the mold 10 or 10' into which the electrode 50 or 50' is to be introduced. During this upward movement of the electrode holder 60 or 60', the collar 52 at the top end of the extension rod 51 is received by the recesses 64 of the retaining plates 63, which are secured to the arm portion 61. The arm portion 61 is then pivotally moved until it is over that mold 10 or 10', to which the electrode 50 or 50' depending from the arm portion is to be fed. The electrode holder 60 or 60' is then lowered until the electrode 50 or 50' is immersed in the slag layer 54 or 54' and the lower end of the electrode is spaced the desired distance apart from the surface of the molten metal or, when the production of a new ingot 55 or 55' is to be initiated, the lower end of the respective electrode 50 or 50' is spaced the required distance apart from the bottom plate 130, 140 or 150. The production of a new metal ingot will always be initiated when the mold 10 or 10' which receives the new electrode 50 or 50' is above the outer bottom plate 130 or 150. During the descent of the electrode 50 or 50', that switch 122 or 122' which supplies current to said electrode is preferably automatically closed. As the electrode 50 or 50', situated into the mold 10, or 10' is fused down, a crane, not shown, is employed to supply a new electrode 50 or 50' from above into the electrode feeder 170 or 170'. To facilitate the introduction of the descending electrode 50 or 50' into the two rings 175 provided on the lever 171, the openings are conically flared upwardly. As soon as the new electrode 50 or 50' is in the electrode feeder 170 or 170', the lever 171 is swung back through the angle $\gamma$, which amounts preferably to about 15°, to its former position by the piston 177, which is contained in the cylinder 179 and to which pneumatic pressure is applied.

In the illustrated plant, the columns 30 and 30', the mold-lifting carriages 20 and 20', the electrode holders 60 and 60', and the bottom plates 130, 140 and 150 have the same respective dimensions. The angle $\alpha$ of the pivotal movement of the electrode holder 60 or 60' from the electrode feeder 170 or 170' to the mold which is over the adjacent outer bottom plate is about 45°. The angle $\beta$ of the pivotal movement of the electrode holder 60 or 60', also measured from the electrode feeder 170 or 170' to the mold which is disposed over the middle bottom plate 140 is approximately 100°.

The two molds 10 and 10' are cooled with water, which flows into the cavities 15 between the cylindrical inner shells 13 and outer shells 14. The cooling water is conducted to and from said cavities 15 with the aid of flexible tubes, not shown.

The mold-lifting carriages 20 and 20' as well as the slide members 67 of the electrode holders 60 and 60' may be provided on each of its four inside walls with four rollers, not shown, which are rotatably mounted on ribs. This arrangement facilitates a vertical displacement of the mold-lifting carriages 20 and 20' and of the electrode holders 60 and 60' on the associated column 30 and 30'. The electrode holders 60 and 60' constitute lifting carriages, which can be vertically displaced along columns 30 and 30' with the aid of tension cables.

The embodiment described hereinbefore by way of example comprise cylindrical molds 10 and 10'. The process according to the invention may alternatively be carried out with different molds, which may be rectangular or square in cross section.

Each of the electrodes 50 or 50' to be fed to the mold 10 or 10' when the same is disposed over the associated outer bottom plate 130 or 150 is desirably smaller in volume (in diameter and/or length) than each of the electrodes 50 or 50', which is introduced into the mold 10 or 10' when the same is above the middle bottom plate 140.

In addition to the contents of the claims, the invention comprises also all details of the embodiment which has been described by way of example.

Compared to the known practices employed in the electric slag refining, the process according to the invention affords the important advantage that it enables the substantially simultaneous production of small metal ingots from single electrodes and of large metal ingots from a plurality of electrodes, which are fused down in succession, which a plant which comprises only two electrode holders and two molds, and that the electrode can be replaced without need for one of the above-mentioned auxiliary electrodes to maintain the temperature of the molten metal. Because in the plant which is provided by the invention to carry out the present process the molds and the main electrodes are pivotally mounted on only two columns, this plant has an extremely small space requirement.

Although the invention is illustrated and described with reference to one preferred embodiment thereof, it is to be expressly understood that it is in no way limited to the disclosure of such a preferred embodiment, but is capable of numerous modifications within the scope of the appended claims.

We claim:

1. A plant for producing ingots differing in size by an electric remelting of metals, said plant comprising:
   two vertical columns, each of which is provided with a mold-lifting carriage, a mold carried by said carriage, and electric holder, and an electrode to be fused down, which is carried by said electrode holder;
   said carriage and electrode holder being mounted to be vertically independently displaceable along said column and to independently pivotally movable relative thereto in a horizontal direction to move said mold and electrode along an arc of a circle which intersects the arc of a circle along which said mold and electrode provided on the other column are movable, so as to provide a plurality of casting positions.

2. A plant as set forth in claim 1, which comprises:
   three bottom plates for supporting metal ingots produced by remelting in said molds;
   one of said bottom plates having a center which lies approximately on a vertical line extending through the arcs of a circle along which said two molds are movable;
   the two other ones of said bottom plates being disposed on opposite sides of said one bottom plate and under respective ones of said circular arcs.

3. A plant as set forth in claim 2, in which said bottom plates consist of copper.

4. A plant as set forth in claim 2, which comprises two electrode feeders, which are disposed beside respective ones of said outer bottom plates.

5. A plant as set forth in claim 4, in which:
   each of said electrode feeders comprises a bellcrank lever having a pivotally mounted vertex, and a shorter arm, which is slightly inclined from the horizontal;
   a cylinder-piston arrangement operable by fluid pressure to impart a pivotal movement to said lever;
   and a support secured to the upper side of said shorter arm and adapted to support a prepared new electrode.

6. A plant as set forth in claim 5, in which:
   said lever comprises a longer arm, which is slightly inclined from the vertical and has two ends, and
   each of said ends is provided with a ring for embracing a prepared new electrode.

7. A plant as set forth in claim 5, in which:
   said lever has a longer arm and is pivotally movable to a position in which said longer arm is inclined by about 15° from the vertical.

8. A plant as set forth in claim 4, in which:
   each of said electrode holders is pivotally movable from the associated electrode feeder to a mold disposed over the adjacent outer bottom plate through an angle of about 45° and to a mold disposed over the middle bottom plate through an angle of about 100°.

9. A plant as set forth in claim 1, which comprises tension cable means operable to displace said carriage and electrode holder vertically along said column.